United States Patent [19]

Ottengraf

[11] Patent Number: 4,806,148
[45] Date of Patent: Feb. 21, 1989

[54] APPARATUS FOR BIOLOGICAL TREATMENT OF WASTE GASES

[75] Inventor: Simon P. P. Ottengraf, Stiphout, Netherlands

[73] Assignee: Clair Tech B.V., Netherlands

[21] Appl. No.: 136,446

[22] Filed: Dec. 21, 1987

Related U.S. Application Data

[63] Continuation of Ser. No. 922,716, Oct. 24, 1986, abandoned, which is a continuation of Ser. No. 771,996, Sep. 3, 1985, Pat. No. 4,662,900, which is a continuation-in-part of Ser. No. 645,298, Aug. 24, 1984, abandoned.

[30] Foreign Application Priority Data

Aug. 31, 1983 [NL] Netherlands ............... 8303031

[51] Int. Cl.⁴ ............................................. B01D 53/14
[52] U.S. Cl. ........................................ 55/223; 55/233; 210/151; 210/916; 435/266
[58] Field of Search ............... 55/84, 85, 89, 90, 91, 55/94, 96, 97, 223, 233; 210/150, 151, 615, 616, 916; 435/262, 266

[56] References Cited

U.S. PATENT DOCUMENTS

| | | | |
|---|---|---|---|
| 2,200,581 | 5/1940 | Pruss et al. ............... | 435/266 |
| 3,216,905 | 11/1965 | Baptist ............... | 435/266 |
| 3,269,542 | 8/1966 | Renzi et al. ............ | 210/615 X |
| 3,376,219 | 4/1968 | Silvey ............... | 435/262 X |
| 3,445,182 | 5/1969 | Tomany ............... | 55/91 |
| 3,828,525 | 8/1974 | Copa et al. ............ | 55/84 X |
| 4,088,571 | 5/1978 | Helgesson ............ | 210/615 X |
| 4,225,381 | 9/1980 | Ishikawa et al. ......... | 435/262 X |

FOREIGN PATENT DOCUMENTS 2558256 7/1977 Fed. Rep. of Germany .
2643211 4/1978 Fed. Rep. of Germany ...... 435/266

*Primary Examiner*—Charles Hart
*Attorney, Agent, or Firm*—Kane, Dalsimer, Sullivan Kurucz, Levy, Eisele and Richard

[57] ABSTRACT

An apparatus for removal of malodorous and/or toxic components from wast gases by biological treatment of the same. Such removal is accomplished by passing the gas stream through a humidifying temperature conditioning section and then through a filter bed. The filter bed consists of a mixture of an organic biological active material, like compost, an inert fraction and additives for neutralization and organic buffering. Also disclosed is the inoculation of the filter bed with specific microorganisms adapted to remove constituents of the gas stream which are difficulty biodegradable, e.g. methylenechloride.

18 Claims, 1 Drawing Sheet

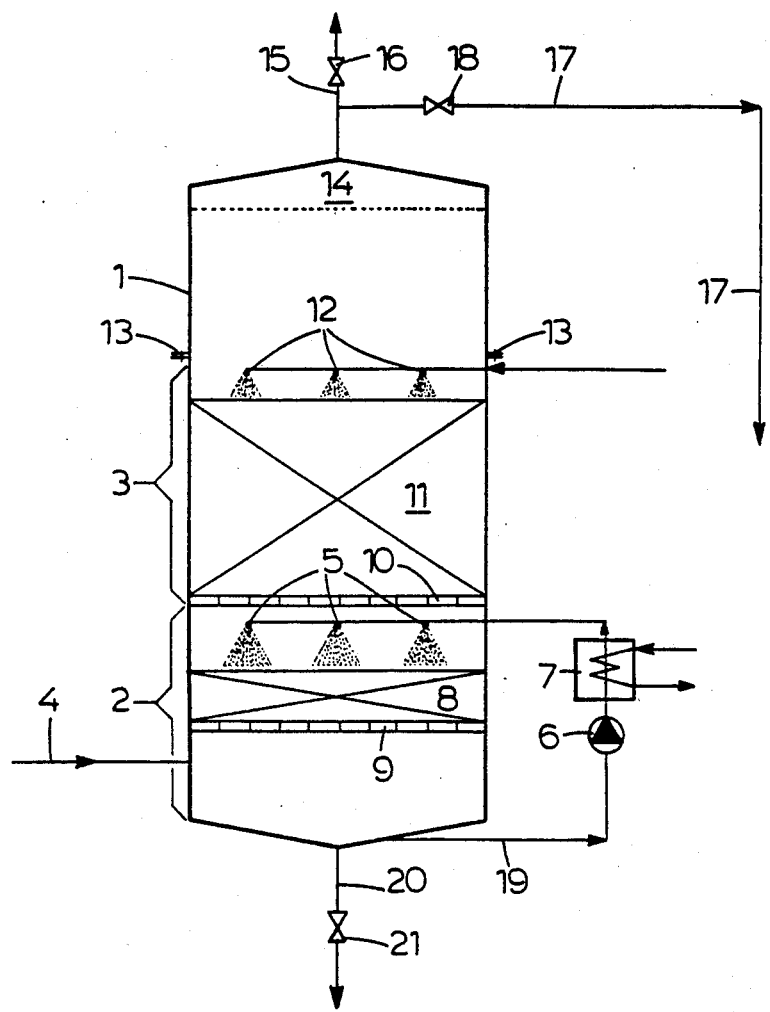

APPARATUS FOR BIOLOGICAL TREATMENT OF WASTE GASES

This application is a continuation of applications Ser. No. 922,716 filed Oct. 24, 1986 now abandoned which application is a continuation of Ser. No. 771,966 filed Sept. 3, 1985 now U.S. Pat. No. 4,662,900; which application are a continuation-in-part of application Ser. No. 645,298 filed Oct. 24, 1984 now abandoned.

The invention relates to an apparatus of biologically filtering gases, in particular waste gases, by passing them through a layer of carrier material which has been provided with appropriate micro-organisms, and to an apparatus for carrying out the method.

For recent years biological filtration is increasingly used for cleaning gas streams originating from various industrial activities like production processes, waste water transport and waste water treatment in order to reduce nuisance, trouble or damage to the environment caused by malodorant and/or poisonous components. In view of the material often used for biological filtration, one also speaks of compost filtration. In biological filters other materials like peat, wood chips or fit-branches are used as the so called carrier materials.

In the biological method the removal of harmful components from the gas takes place by activity of micro-organisms, mainly bacteria and fungi, which are present on or in the carrier material. The carrier materials for that purpose are disposed in a container. The assembly of container, carrier materials and micro-organisms usually is called a biological filter. The gas to be treated is introduced into the container by a fan, the gas passing through the carrier material from above to below or vice versa. The components to be removed from the gas are adsorbed at the carrier material and converted by the microorganisms present on or in the carrier material into substances which are not harmful to the environment.

A method and apparatus of the kind mentioned in the preamble are disclosed in the Dutch patent applications No. 81.04987 and in the German patent applications Nos. 2.445.315, 2.558.256 and 2.605.606.

The Dutch patent application No. 81.04987 discloses a biological filter for cleaning gases, wherein relatively large inactive particles of the starting compost are added to the active compost with the primary object of reducing the pressure drop across the filter and hence the energy consumption.

According to the Westgerman patent application No. 2.445.315 the activity of the filter is increased by mixing the carrier material with bentonite earth. Thereby heavy metals which adversely affect the biological activity of micro-organisms are chemically bound to bentonite so as to maintain the required biological activity.

It is noted, that the carrier material in biological filters usually is composed of particles of such size that besides a reasonable adsorbing surface also an acceptable flow resistance is guaranteed. A too small adsorbing surface leads to a too large and uneconomical volume of the flter, whereas a too large filter resistance is accompanied by a too large energy consumption in passing the gas stream through the filter.

Furthermore it is noted that for optimal operation of the biological filter a water content of 40–60% in respect of the weight of the carrier material is necessary. In the known methods and apparatuses humidity control, if any, is realized by spraying water across the upper surface of the filter.

It has now appeared that by spraying water onto or into the carrier material it is not or not sufficiently possible to realize an adequate humidity control. In particular the degree of humidity of the most active portion of the filter, i.e. the lower side, when the flow through the filter is from below to above, cannot sufficiently be controlled by the known method. The known method, e.g. by spraying water externally or internally, is only capable of restoring to the desired water content of the carrier material, which by calamities have dried too much.

At too low a moisture content of the carrier material the biological activity will strongly diminish or even totally disappear.

Furthermore, shrink cracks develop in the carrier material in consequence of drying up resulting in short circuiting the gas flow in the bed so that a considerable portion of the waste gas is withdrawn from the contemplated biological treatment. Shrink cracks can be avoided to a large extent by the choice of a suitable carrier material.

A too high moisture content in the carrier material results in the development of anaerobic zones. Such zones have an increased flow resistance precluding a homogeneous flow of gas, which results in a considerable decrease of the average residence time of the gas in the filter bed.

Furthermore the anaerobic zones produce volatile metabolic products leaving the bed with the waste gas. Since the produced metabolic products have malodorant properties, they contribute so the undesired malodorant nuisance.

It is noted that the micro-organisms responsible for decomposing the mainly organic components which are present in the gas to be treated, require various inorganic nutrients for their metabolism. As basic material various kinds of compost are satisfactory for this purpose. These materials, however, have the common disadvantage of being strongly subject to aging. Some kinds of compost have a tendency of lumping accompanied by a strong decrease of the specific surface area (surface area per unit of volume) aging phenomena of the carrier material can be caused by local loss of moisture by a too low relative humidity of the air and/or the occurrence of temperature gradients in the carrier material.

The occurrence of temperature gradients in the carrier material is inherent to the microbiological activity.

This activity may be locally different. Where this activity is high, the temperature will be slightly higher than elsewhere as a result of the realised energy of oxidation.

As a result of these temperature gradients will develop also gradients in the maximum water vapour pressure. This implies that biologically active zones have a tendency of drying up while less active zones take up this excess water by condensation.

As a result active zones will experience a loss of activity and wet, mostly inactive zones will take up still more water.

Aging phenomena in the carrier material mostly manifest themselves by the development of shrink cracks in the carrier material in which drying occurs, and by the development of wet, often anaerobic zones. Such aging phenomena are mostly irreversible, which means, that a shrink crack once developed will not disappear automatically.

It has been known that aging phenomena of this kind can be prevented by continuously moving the carrier material throughout the bed and mixing it up outside of the bed as disclosed by the German patent application No. 2.445.315.

Another problem presented by the known methods and apparatuses is that in the microbiological conversion of certain organic components in the waste gases acid components, a.o. acetates, are produced as intermediate products. Such acid components contribute to acidification of the carrier material and as a result the microbiological activity will drastically decrease or even totally disappear.

Furthermore the decomposition of other organic compoments by acid-intolerant organisms can be considerably hampered. This, for example, is the case with the decomposition of toluene.

In the use of biological filters for cleaning waste gas strongly varying loadings often occur due to discontinuous processes.

The active micro-organisms in the filter consequently are subject to loadings fluctuating in time. In such cases the concentrations of polluting components in the effluent gas may strongly vary unless one proceeds to the use of a strongly oversized filterbed.

It can be generally stated that these fluctuations may adversely affect maintaining an optimal microbiological activity. In discontinuous gas discharges no loading at all takes place at the filter during certain periods of the day. Though the micro-organisms may well survive during periods of shut-down, also of longer duration, for example, weeks, it still means, that the decomposing capacity of the micro-organisms is not fully exploited.

The invention now has the object of providing a method and apparatus for biologically filtering gases wherein the above mentioned disadvantages are removed in an efficient manner.

For this purpose the method of the invention is characterized in that the gases prior to being passed through the carrier material are brought into intimate contact with water in such a manner that the gases contain the quantity of water required for the optimum activity of the micro-organisms, the gases are brought to the temperature required for that purpose, and any water soluble substances present in the gases dissolve at least partially.

The gases to be treated are brought into intimate contact with water by spraying. This brings the gas streams to the right humidity and to the required temperature as is necessary for the micro-organisms of the carrier material in the filter to function optimally.

Furthermore as a result of spraying the gases to be treated in a socalled pretreatment chamber the water soluble components of the gas stream will at least partially dissolve in the water so as to be removed from the gas stream. Thereby the components which are toxic for the micro-organisms can be removed from the gas stream during this pretreatment so as not to affect the activity of the micro-organisms.

In case of non-toxic but water soluble components decomposable by micro-organisms a considerable portion thereof can be removed from the gas stream by dissolving. For decomposing the so dissolved components in accordance with the invention now a specific biological population, for example, active sledge, can advantageously be introduced into the spray water.

In this manner a lager quantity of components can be removed per unit of time from the gases to be treated so as to increase the efficiency of the biological filter which subsequently is contacted by the gas.

Research at the Eindhoven University of Technology on which the invention is based, has shown that adding certain additional materials to the carrier material yields very favourable results.

The additional materials of the invention can be subdivided into materials preventing the development of shrink cracks in the carrier material and reducing the flow resistance of the biological filter on the one hand, and additional materials counteracting acidification of the filtermaterial on the other hand.

In particular it has been shown in accordance with the invention that modifying the structure of the carrier material by adding additional material of the first type may prevent the very disadvantageous aging phenomena. As a result of adding the additional material, which currently is inert material to the carrier material, for example, compost, and by mixing it therewith the development of shrink cracks can be counteracted.

As additional material of the first-mentioned type, which mainly is inert, and has a diametrical particle size of 3-10 mm, the following substances having a more or less rigid structure can successfully used in accordance with the invention: organic materials, like polyethylene, polystyrene, particles of ground automobile tires, as well as inorganic materials like fired clay particles, ground lava bits, ground coalcinder particles and pelletized flue gas particles, perlite and active coal.

The proportion of mixing the additional material with the carrier material is between 30–70% and 70–30% on the basis of volume.

The additional material should previously be thoroughly mixed with the carrier material, for example compost, so as to obtain a loose structure having a large specific surface.

This mixing can take place simultaneously with other additions if necessary or preferable. In this respect, for example, micro-organisms which by nature are not present in or on the carrier material can be applied to the carrier material by inoculation.

Furthermore, the research at the Eindhoven University of Technology has shown that by the choice of a suitable additional material also the flow resistance can be considerably decreased. So, for example, the flow resistance at a surface loading of 200 $m^3/m^2$/hour is about 8 mm head of water per meter of bed height when using a mixture of 50%–60% polyethylene particles (low density nr. 1500, particle diameter about 4 mm) and 50%–40% compost.

In contrast therewith there is at a same value of surface loading a pressure drop of about 120 mm head of water per meter of bed height when no polyethylene particles are added.

Porous additional materials having a high internal porosity and hydrophilic properties are advantageous, since such materials may function as a buffer for excess moisture in the carrier material, which excess moisture in case of excessive loss of moisture can be yielded by such materials. This effects a certain degree of humidity control in the carrier material.

The disadvantage of acidification of the carrier material can be advantageously removed by the use of additional materials of the second type counteracting the acidification of the filter material. For this purpose a pH-reducing alkaline substance is added to the carrier material and intimately mixed therewith. Advantageously, for example, marl, limestone and calcium carbonate in a weight proportion of 2–40% in respect of the carrier material can be considered for preventing acidification of the carrier material. It has appeared that in particular cases (for example, the micro-biological decomposition of methylene chloride) considerably higher weight proportions should be applied, which may range up to a value of 40% in respect of the total filling quantity.

The research at the Eindhoven University of Technology besides the previously mentioned two types of additional material has shown active carbon to be very suitable as additional material.

Active carbon added to the carrier material in a quantity of 1–50 kg/m$^3$ appears to be very favourable in case the present biological filters of the invention are subjected to various loads as in various and/or discontinuous processes. The active carbon in such case is or is not mixed with the carrier material. These carbon particles have adsorbing properties for organic components which are present in the waste gas to be treated.

Besides active carbon other substances having adsorbing properties may be used, for example polyethylene glycol.

Besides their good adsorbing properties such substances should also have good desorbing properties. Thereby it is possible that during a period of increased supply the adsorbens temporarily adsorbs the concentration excess and desorbs it at lower loads on behalf of the micro-biological decomposition. This permits in principle a considerable reduction in the filter volume required at discontinuously discharging plants.

When very concentrated waste gas streams are discharged during a short period, in order to reduce the volume of the filter a quantity of adsorbens (active carbon) is required which will be in excess of 50 kg/m$^3$ and will be at maximum $\pm$250 kg/m$^3$.

At such high concentrations of carbon these particles can also take over the function of inert carrier material.

It is noted that in accordance with the present method the temperature of the spray water is chosen so that the temperature of the gases to be treated is between 10° and 40° C.

In accordance with the invention the relative humidity of the gases after pretreatment with water is usually 95–100%.

The invention also relates to an apparatus for carrying out the method of the invention for biologically filtering gases, in particular waste gases.

Such apparatus comprises a container including a biological filter unit, a supply conduit for the gases to be treated at the lower side and a discharge conduit for the gases to be treated at the upper side.

The apparatus of the invention is characterized in that at least one filter unit is arranged in the container and a pretreatment chamber for the gases to be treated is disposed under or at the lower side of the lowermost filter unit.

Usually the container is cylindrical, though it may be rectangular or be differently shaped.

In the apparatus of the invention the pretreatment chamber and the lowermost filter unit are separated from each other by a support layer permeable for the gas to be treated. The support layer usually is a perforated metal or plastics plate. The pretreatment chamber is provided with a spraying water facility for intimately contacting the waste gases with water.

In a favourable embodiment the pretreatment chamber is provided with a contact bed arranged above the supply conduit for the gases to be treated and resting on the gas-permeable support layer, a discharge conduit for spraywater under the support layer and the spraying facility for the water above the contact bed. The contact bed enhances the intimate contact between the gases to be treated and the spray water. The contact bed advantageously can be a gravel bed, though other suitable materials also can be used.

To reduce the quantity of water used, it is advantageous, when the spraying facilities are connected to a discharge conduit for spraywater via a circulation conduit including a circulation pump for circulating the spraywater.

For adjusting the temperature of the spraywater it is favourable when the circulation conduit includes a heat exchanger. Adjacent to the pretreatment chamber is a filter unit, which, in a simple embodiment, consists of a gas-permeable support plate and a biologically active zone. Currently, the gas-permeable plate is a perforated metal or plastics plate.

In order to obtain a more homogeneous distribution of the gases to be treated across the biologically active zone use can be made of a contact material on which the biologically active zone rests. As a contact material advantageously lava bits or gravel are used, though other suitable materials also can be considered for this purpose.

According to the invention the biologically active zone can be composed of a suitable carrier material, for example compost, peat, wood chips, etc. Preferably, the biological active zone is composed of such carrier material and an appropriate additional material as discussed previously.

Advantageously, spraying facilities are dispassed in the upper portion of the filter unit in order to prevent the biologically active zone from drying up in case of calamities.

There can be circumstances requiring that the apparatus has a plurality of filter units disposed above each other and separated from each other by a gas-permeable support plate being a perforated metal or plastics plate as mentioned previously.

A favourable embodiment of the apparatus is illustrated in the single drawing.

The container 1 which in this embodiment is cylindrical is composed of a pretreatment chamber 2 for the waste gases and a filter unit 3. In the pretreatment chamber is provided the supply conduit for the gases to be treated 4 and the support layer 9 which in this embodiment is a perforated metal plate. The pretreatment chamber may be arranged separately from the container.

On the support layer 9 a gravel bed is provided for enhancing the contact between the upward gas-stream and the downwardly sprayed liquid.

Up in the pretreatment chamber 2 spraying means 5 are provided. Down in the pretreatment chamber 2 the spray water may be tapped through the discharge conduit 20 and the valve 21 or it may be circulated through the circulation conduit 19 including the circulation pump 6 and the heat exchanger 7. In the heat exchanger 7 the spray water can be brought to the desired temperature, i.e. when a higher temperature is desired, the spray water can be heated in the heat exchanger or when a lower temperature is desired, the spray water can be cooled.

Above the pretreatment chamber 2 is provided the filter unit 3 separated by the gas permeable support plate 10 on which rests the biologically active zone 11. The biologically active zone 11 can be composed of the carrier material alone but preferably of a mixture of carrier material and the previously discussed additional materials.

Above the biologically active zone 11 are provided sprayers 12 which in case of emergency, for example, when the spraying means 5 in the pretreatment chamber 2 should fail, can secure the moistening of the biologically active zone.

On the filter unit 3 is fastened the top section 14 through the fastening means 13, for example a screw means.

The biologically filtered gas can now be discharged to the atmosphere through the discharge 15 and the valve 16 or it can be conducted through the conduit 17 and the valve 18 to a measuring and sampling apparatus.

On the filter unit 3, if desired, a plurality of filter units can be arranged which then can be fastened together by a similar fastening means as 13, for example.

For convenience, such fastening means can be a screw means.

The use of more than one filter unit can be necessary in cases wherein the waste gases to be treated contain components requiring for their decomposition different conditions possibly including different micro-organisms or when the waste gases to be treated include one certain component in such a high concentration that the capacity of one filter unit is inadequate for sufficiently decomposing it.

By a uniform construction of the filter units the apparatus of the invention, if desired, can be adapted to biologically cleaning various waste gases of different compositions by simple fastening the said filter units on each other.

The principle of multiple filter units can also be applied by dividing a gas stream to be treated into two of more equal streams and by conducting the separate streams to separate filter units disposed above each other in one column.

When the method is effected in such an apparatus, a considerable further reduction of the pressure drop of the gas stream through the filter can be reached. This decrease of the pressure drop for two units arranged inparallel theoretically amounts to a factor 4 in comparison with the case of two units in series: namely a factor 2 for the reduction of the gas loading per m² of filterarea traversed and a factor 2 for the reduction of the filter height.

The apparatus of the invention will now be explained by way of the following examples.

EXAMPLE I

An apparatus according to the invention and including a pretreatment chamber and five filter units arranged in series was continuously fed with a synthetic waste gas from a paint spraying shop. The diameter of a filter unit was 15 cm, the filing height was 60 cm, the volume of carrier material thus being about 11 l per filter unit. The composition of the filter material was 29% by weight of peat compost, 59% by weight of polyethylene particles (low density nr. 1500, average particle diameter about 4 mm), 2% by weight of marl.

The filter material was inoculated with an active sludge suspension and a toluene decomposing organism which was isolated from a ground sample of a petrol filling station.

The synthetic waste gas contained a mixture of the components aethyl-acetate, butyl-acetate, butanol and toluene. The gas output practised was 67 l/min corresponding to a gas load of 220 m³/m²/hour, the temperature was about 20° C. The measured total pressure drop across the filter units at the said gas output was 26 mm head of water.

Under stationary conditions the following concentrations were measured:

| | Gas concentration in mg/m³ | | | |
|---|---|---|---|---|
| Component | toluene | butylace-tate | aethylace-tate | butanol |
| supply pretreatment chamber | 958 | 218 | 205 | 127 |
| discharge pretreatment chamber | 941 | 214 | 200 | 0 |
| discharge first filter unit | 936 | 89 | 95 | 0 |
| discharge second filter unit | 928 | 17 | 38 | 0 |
| discharge third filter unit | 908 | 0 | 0 | 0 |
| discharge fourth filter unit | 872 | 0 | 0 | 0 |
| discharge fifth filter unit | 810 | 0 | 0 | 0 |

EXAMPLE II

A heavily loaded apparatus including a pretreatment chamber and a one-stage filter unit was fed with a synthetic waste gas which contained aethyl-acetate as a polluting component. The filter unit had a diameter of 15 cm and a filling height of 100 cm, thus a filling volume of about 18 l. The filling material of the filter unit consisted of 7920 g of peat compost, 108 g of polystyrene particles (diameter about 3 mm) and 216 g of marl.

The said filling material was inoculated with micro-organisms from an active sludge suspension taken from a waste water treatment plant.

The filter unit was daily intermittently loaded: during 8 hours per 24 hrs a waste gas at a volume output of 100 l/min and therefore a gas load of 340 m³/m²/hour, and having an aethyl-acetate inlet concentration of 825 mg/m³ was fed. During the remaining 16 hours aeration of the filter with clean air (air output 10 l/min) took place.

Eight days after start-up of the filter the dynamic behaviour was studied. For that purpose the concentration of aethyl-acetate in the waste gas from the filter unit was measured after application of the load.

This concentration appeared to increase substantially immediately from zero value until after about 30 min a stationary waste gas concentration of about 320 mg/m³ was reached. This concentration was maintained during the remaining period of 7½ hours for which the filter was loaded.

EXAMPLE III

To the filling material in the apparatus described in Example II 549 of active carbon was added to be mixed therewith.

Also in this case the filter was daily intermittently loaded in accordance with the data in Example II, it being understood that at the same time the inlet concentration of aethyl-acetate in the synthetic waste gas to be cleaned had been further increased to about 1610 mg/m$^3$.

After the filter in this way had been loaded for about 14 days, the dynamic behaviour was again studied. After application of the load the concentration of ethyl-acetate in the waste gas during the first 30 min appeared to be substantially zero to slowly increase subsequently.

This increase continued during the remaining time of the loaded period. At the end of this period, after 8 hours, the ethylene-acetate concentration in the waste gas was about 700 mg/m$^3$.

EXAMPLE IV

An apparatus according to the invention including a pretreatment chamber and three filter units arranged in series was discontinuously fed with a waste gas from a pharmaceutical plant. The diameter of a filter unit was 150 cm, the filling height was 100 cm, the volume of carrier material thus being 1,77 m$^3$ per filter unit. The composition of the filling material in the filter unit was 21% by weight of peat compost, 39% by weight of marl and 40% by weight of active carbon.

Once a week a waste gas was treated by the filter, said gas a.o. containing a methylene chloride concentration of 500 mg/m$^3$ after the pretreatment chamber. The gas output practised was 350 m$^3$/hour corresponding to a gas load of 200 m$^3$/m$^2$/hour. The discharge time of the waste gas was 5 hours. In these 5 hours the methylene chloride was quantitavely captured in the upper filter unit by adsorption at the active carbon present in the filling material. After the discharge of the waste gas the methylene chloride was desorbed from the active carbon by passing an output of 50 m$^3$/hour of clean room air through the filter. The desorbed methylene chloride was adsorbed by the biologically active fraction of the filling material and subsequently biologically decomposed.

The biological decomposing capacity of the filling material for the recalcitrant component methylene chloride was obtained in that before the start-up a suspension of methylene chloride decomposing microorganisms, which had been especially prepared for this purpose, was mixed through the filling material of the upper filter section.

The biological decomposing capacity of methylene chloride at 20° C. was 30 g/m$^3$/hour.

I claim:

1. Apparatus for biologically filtering gases containing pollutants, in particular industrial waste gases by a fixed bed type filter material containing a carrier material which has been provided with appropriate microorganisms which are stationary within the fixed bed on the surface of the carrier material, wherein the gases are initially water saturated prior to their entrance into the filter material by bringing the gases into intimate contact with water in such a manner that the gases contain the quantity of water required for the microorganism to optimally function the water saturated gases are then directed into the filter material and passed through it, whereby the pollutants in the water saturated gas come in direct contact with the microorganism on the surface of the carrier material, the apparatus comprising a container including at least a biological fixed bed type filter unit including the fixed bed having a carrier material, a supply conduit for the gases to be treated at the lower side and a discharge for the treated gases at the upper side, characterized in that at least one filter unit is arranged in the container, means for moisturizing with water the gases prior to entry of the gases into the fixed bed including a pretreatment chamber, means for introducing gases to be treated into the pretreatment chamber, means for controlling the temperature of the water for moisturizing the gases, and the fixed bed located downstream of the moisturizing means, means for directing the pretreated gases to the filter unit.

2. Apparatus of claim 1, characterized in that the moisturizing means includes a pretreatment chamber arranged separately from the container.

3. Apparatus of claim 1, characterized in that the container is cylindrical.

4. Apparatus of claim 1, characterized in that the moisturizing means includes a pretreatment chamber and the lowermost filter unit separated from each other by a support layer permeable for the gas to be treated.

5. Apparatus of claim 4, characterized in that the gas-permeable support layer is a perforated metal or plastics-plate.

6. Apparatus of claim 1, characterized in that the moisturizing means includes a pretreatment chamber provided with spraying facilities for the water.

7. Apparatus of claim 1, characterized in that the moisturizing means includes a pretreatment chamber provided with a contact bed arranged above the supply conduit for the gases to be treated and resting on the gas-permeable support layer, a discharge conduit for spraywater under the support layer and the spraying facilities for the water above the contact bed.

8. Apparatus of claim 7, characterized in that the contact bed is a gravel bed.

9. Apparatus of claim 7, characterized in that the spraying means are connected to a discharge conduit for spraywater via a circulation conduit including a circulation pump for circulating the spraywater.

10. Apparatus of claim 9, characterized in that the circulation conduit includes a heat exchanger.

11. Apparatus of claim 1, characterized in that the filter unit comprises a gas-permeable support plate and a biologically active zone.

12. Apparatus of claim 11, characterized in that the gas-permeable support plate is a perforated metal or plastics-plate.

13. Apparatus of claim 11, characterized in that the biologically active zone rests on a contact material.

14. Apparatus of claim 13, characterized in that said contact material is selected from lava bits, and gravel.

15. Apparatus of claim 11, characterized in that the biologically active zone is composed of a suitable carrier material and an appropriate additional material as defined in the preceding method claims.

16. Apparatus of claim 1, characterized in that spraying facilities are disposed in the upper portion of the filter unit.

17. Apparatus of claim 1, characterized in that in case of more than one filter unit these are separated by a gas-permeable support plate.

18. Apparatus of claim 17, characterized in that the support plate is a perforated metal or plastics-plate.

* * * * *